May 28, 1968  H. L. EICKELBERG ET AL  3,385,582
CHARGING BUCKET
Filed Dec. 28, 1965  4 Sheets-Sheet 1
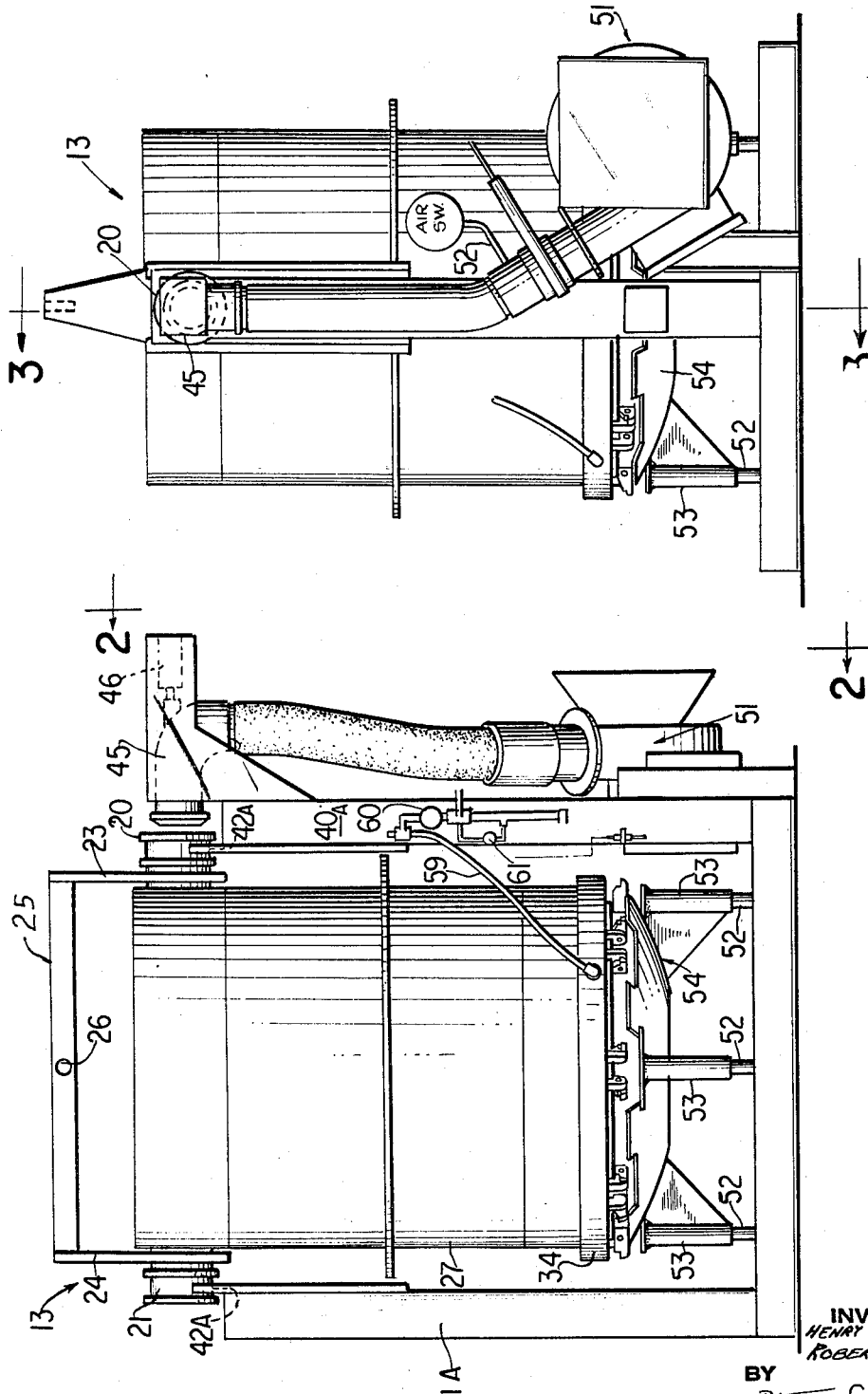

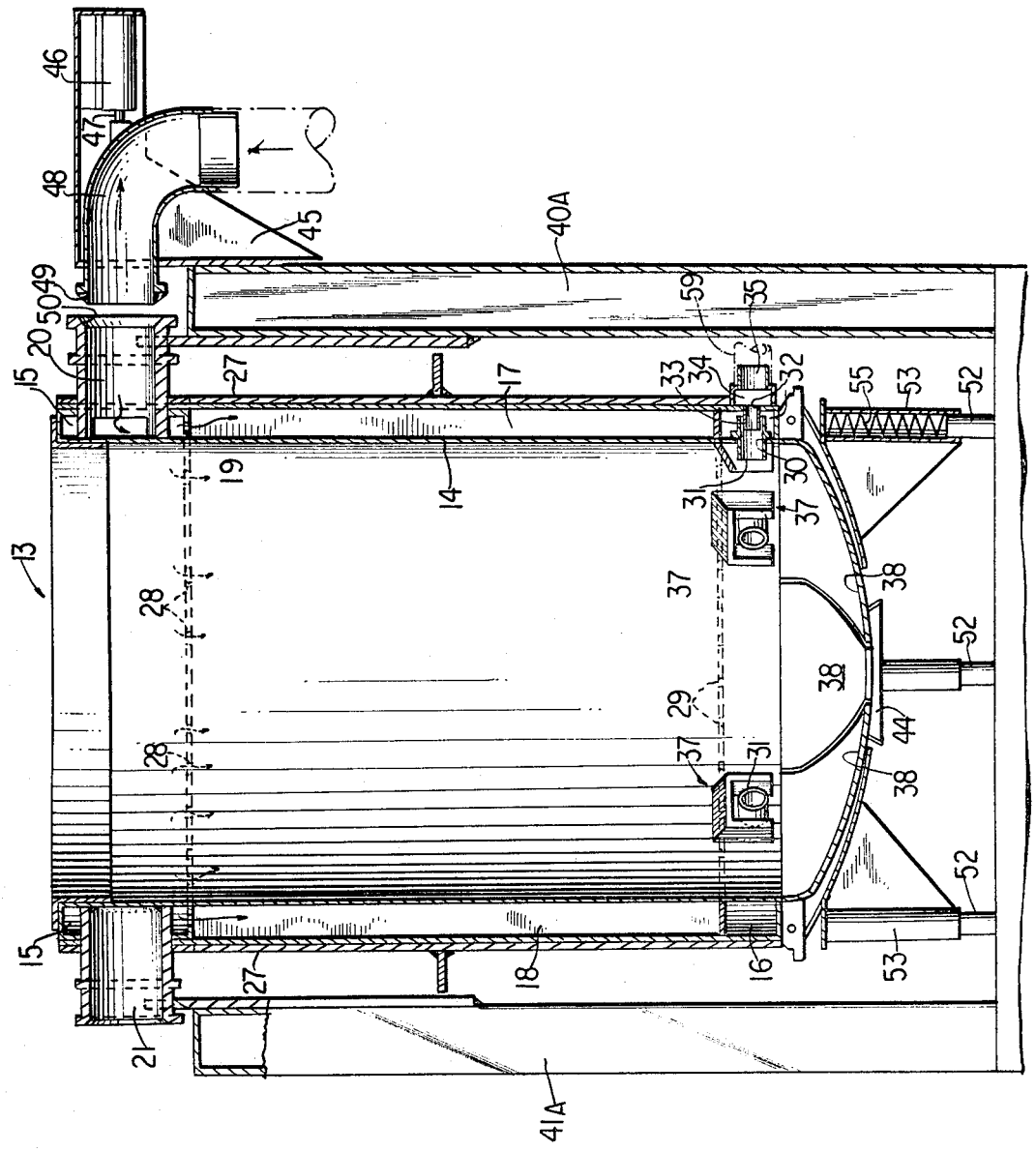

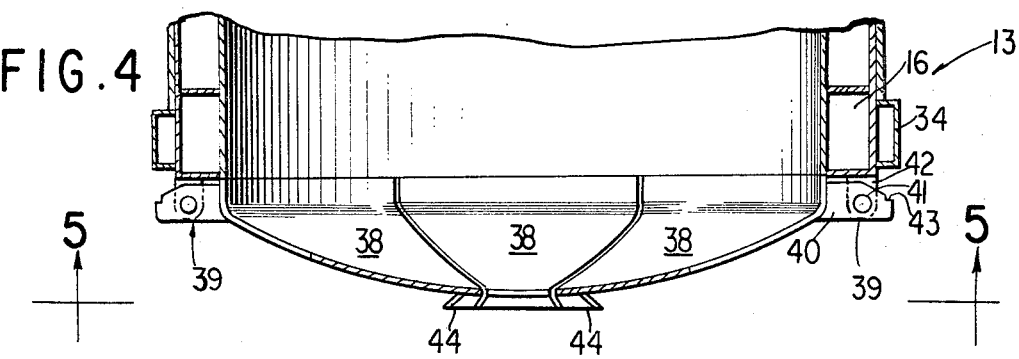
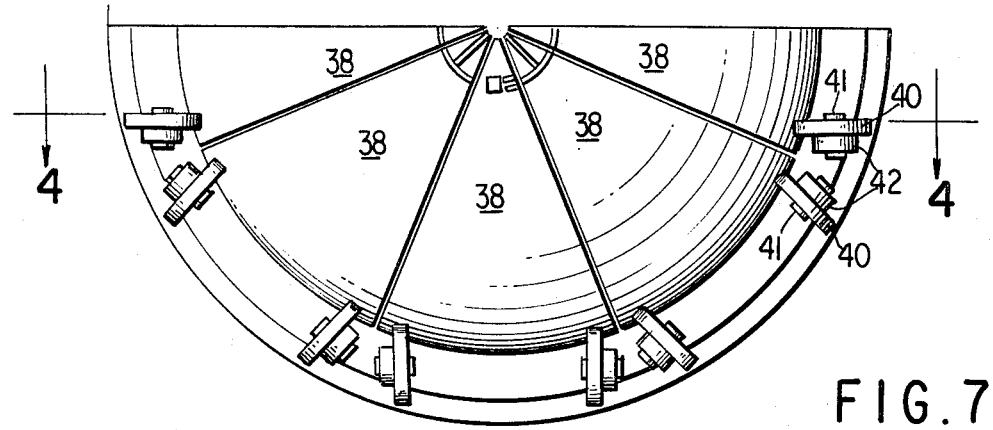
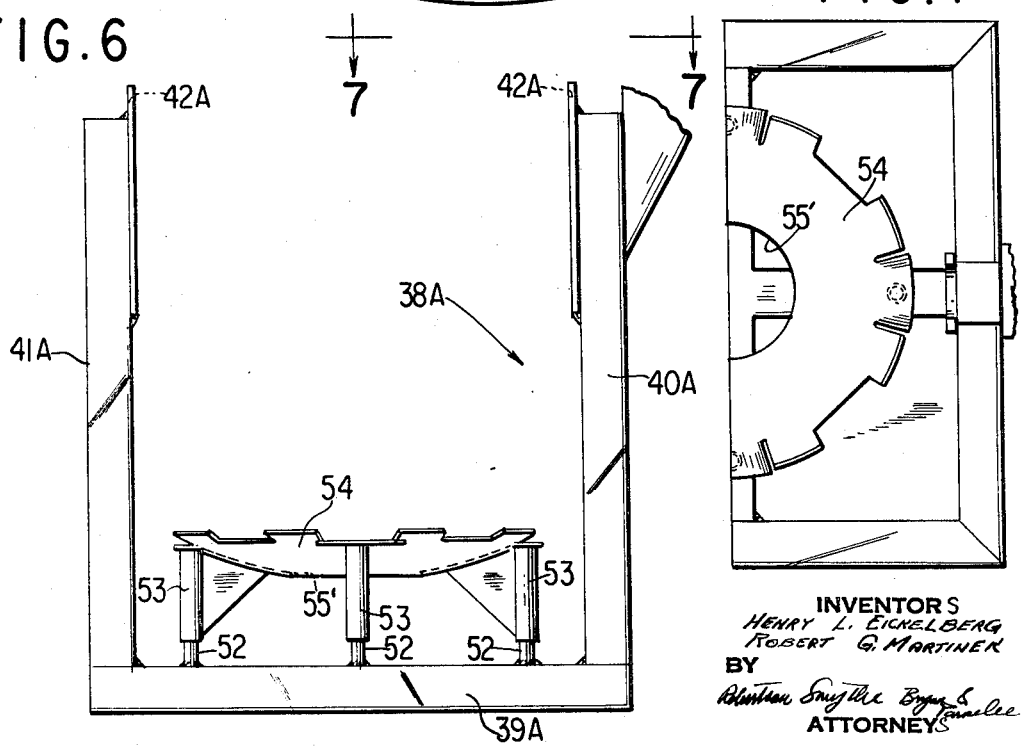

May 28, 1968    H. L. EICKELBERG ET AL    3,385,582
CHARGING BUCKET

Filed Dec. 28, 1965    4 Sheets-Sheet 4

INVENTORS
HENRY L. EICKELBERG
ROBERT G. MARTINEK
BY
ATTORNEYS

United States Patent Office 3,385,582
Patented May 28, 1968

3,385,582
CHARGING BUCKET
Henry L. Eickelberg and Robert G. Martinek, Watertown,
Wis., assignors to Basic Products Corporation, Milwaukee, Wis., a corporation of Wisconsin
Filed Dec. 28, 1965, Ser. No. 518,757
9 Claims. (Cl. 263—47)

This invention relates to charging buckets for steel mills and the like, and particularly to an improved charging bucket and stand for preheating a loaded charging bucket.

Electric arc furnaces are conceded to be the outstanding large capacity melters today where product quality is an important consideration. However, their use is narrowed by two limitations. First, they have a high initial cost per ton of melting capacity. Secondly, electricity is costly. Approximately 340 kilowatt-hours or about 1.16 million B.t.u.'s per hour must be transferred to one ton of steel to melt and superheat it to 2800° F. The energy to preheat this steel to 1200° F. is 76 kilowatt-hours, which amounts to 260,000 B.t.u.'s per hour. Thus, approximately 22% of the total energy required has to be supplied in the range up to 1200° F.

Electric arc or induction furnaces are usually charged cold from a charging bucket which generally has a bottom design such as a clam-shell, flat-bottom single door, flat-bottom multidoor, round bottom or segmental design. These charging buckets are picked up by a crane, brought out to the scrap yard and the charge is assembled in the bucket. When the furnace is to be charged, its top or cover is removed and the charging bucket is lowered into, or is located over the open furnace, whereupon the cold charge is dropped onto the furnace floor. Usually more than one bucket is required to charge the furnace. The bucket is removed, the cover replaced, and the next melting cycle is begun.

The principal object of the present invention is to provide a gas-fired preheated charging bucket for electric arc furnaces and the like.

Another object of the invention is to provide such a charging bucket and a preheating stand therefor.

Still another object of the invention is to provide such a charging bucket in which the combustion air is preheated as it moves toward the nozzle that mixes the gas and air just prior to its combustion.

Another object of the invention is to provide such a preheated charging bucket in which the danger of local overheating will be reduced.

In one aspect of the invention, the charging bucket may comprise a heavily constructed inner container having a clam-shell door arrangement on its bottom. It may also include a channel ring surrounding its top portion, a channel ring surrounding its bottom portion, and vertically disposed channel members, which may be diametrically opposed, extending between the top and bottom rings, open to the interior of the top but closed to the bottom.

In another aspect of the invention, hollow trunnions may be integrally connected to the vertical channel members such that the interior of the hollow trunnions communicates with the interior of the vertical and the top ring channels. This provides inlet means for the combustion air near the top of the bucket.

In still another aspect of the invention, an outer shell surrounds the channel rings, providing an annular space between the top and bottom channel members, forming an air preheat mantle around the inner bucket.

In still another aspect of the invention, the top channel member has spaced holes in its bottom wall while the bottom channel member has spaced holes in its top wall.

In a further aspect of the invention, a series of circularly spaced holes is provided in the wall of the inner bucket within the confines of the lower ring channel member. Alloy burner nozzles are welded into these holes.

In a still further aspect of the invention, another channel ring member surrounds the lower channel ring and it forms a gas ring manifold. It possesses holes that correspond with the nozzles in the inner wall and in which alloy burner nozzles are located that extend into the nozzles in the inner wall with clearance between them for the passage therethrough of combustion air, thus forming mixing burner nozzles surrounding the bucket.

In another aspect of the invention, deflectors will be provided on the interior of the inner bucket adjacent each nozzle to prevent scrap from falling in front of a burner and blocking the combustion flow and flame.

In still another aspect of the invention, a stand will be provided with half bearings to receive the trunnions of the bucket and support it and also to align it during a preheating operation.

In a further aspect of the invention, there will be gas inlet connections to the gas ring manifold, and lighting holes will be provided beneath each burner to allow the application of a gas torch for lighting purposes.

In a still further aspect of the invention, blower means will be provided on the stand, and the air therefrom is conducted to the trunnions and to the bucket. Also, valves will be provided for controlling the flow of air therethrough.

In another aspect of the invention, means may be provided for ensuring a connection between the combustion air supply means and the hollow trunnions of the bucket.

The above, other objects and novel features of the improved preheat charging bucket and stand therefor will become apparent from the following specification and accompanying drawings which are merely exemplary.

In the drawings:

FIG. 1 is a front elevational view of a charging bucket and preheating stand to which the principles of the invention have been applied;

FIG. 2 is a view of the apparatus shown in FIG. 1, looking in the direction of the arrows along line 2—2 of FIG. 1;

FIG. 3 is an enlarged sectional view taken substantially along line 3—3 of FIG. 2;

FIG. 4 is a view of part of the apparatus of FIG. 3;

FIG. 5 is a view taken substantially along line 5—5 of FIG. 4;

FIG. 6 is an elevational view of the charging stand;

FIG. 7 is a sectional plan view taken substantially along line 7—7 of FIG. 6;

Figure 8:
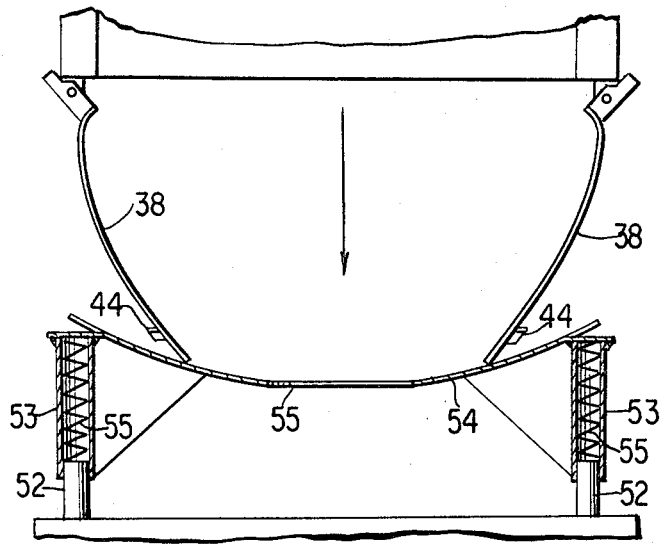
FIG. 8 is a view of a portion of FIG. 3, shown in a different position.
Figure 9:
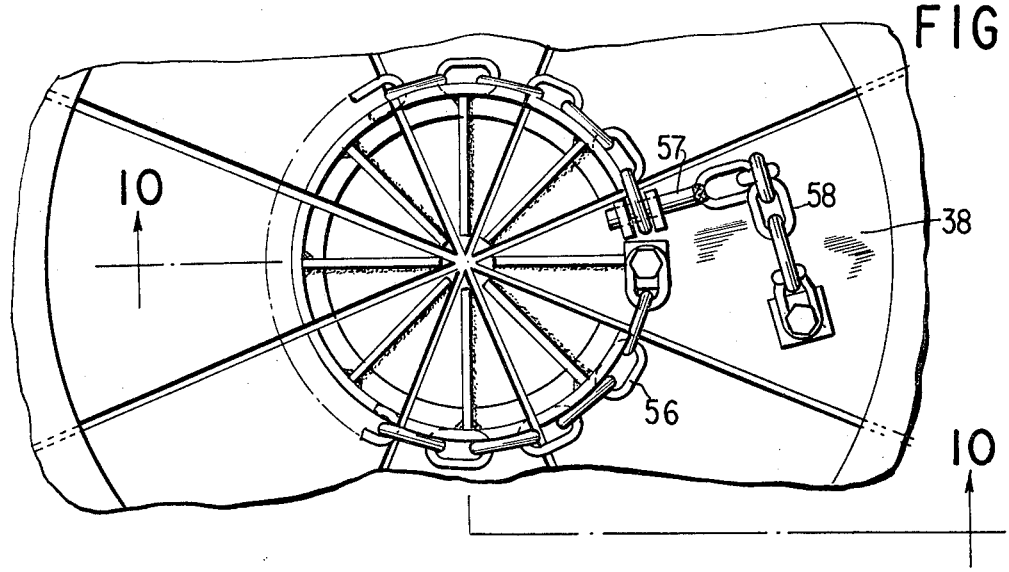
FIG. 9 is a bottom plan view of the charging bucket in closed position.

Referring to the drawings, the principles of the invention are shown as applied to a charging bucket 13 including an inner container 14 (FIG. 3) about the top of which a channel ring 15 extends. Another channel ring 16 extends about the lower end of container 14. Vertically extending channel members 17 and 18 may extend between the rings 15 and 16. The top of the channel members 17 and 18 are open at 19 to the interior of ring 15 but closed to the interior of ring 16.

Hollow trunnions 20, 21 are arranged near the top of bucket 13 and are connected to the vertical channel members 17 and 18. Lifting arms 23 and 24 may be pivoted on trunnions 20, 21 and connected by a cross bar 25 having a crane hook hole 26 centrally thereof.

Outer shell 27 may surround the bucket 13, enclosing the vertical channel members 17, 18 and providing an annular chamber between the inner container 14 and the outer shell 27. A series of spaced holes 28 may be arranged throughout the extent of the bottom wall of channel ring 15, and a series of holes 29 may be arranged throughout the extent of the top wall of the channel ring 16.

There may be provided a series of holes 30 arranged about the inner shell of container 14 within the confines of the channel ring 16, and alloy nozzle members 31 may be welded or otherwise secured in holes 30 and extending radially outwardly into channel ring 16. There may be provided another series of holes 32 about the outer periphery of channel member 16, and each of these may be radially aligned with a corresponding nozzle member 31 in container 14. Alloy burner nozzles 33 may be fixed in each hole 32 and may extend into its corresponding nozzle member 31 with an annular clearance thereabout through which combustion air passes.

A gas manifold in the nature of a channel ring 34 may surround, and be connected to the outer periphery of the channel ring 16. Inlet port means 35 may be provided for ring 34 which is adapted to be connected to a flexible gas supply line 59.

In order to prevent scrap metal, during loading of bucket 13, from becoming lodged in front of any of the nozzle members 31, alloy deflectors 37 (FIG. 3) may be provided on each side of each member 31 about the interior of the bucket 13. Other arrangements can be used.

Referring to FIG. 6, in order to load bucket 13 and to preheat the contents thereof, a loading frame 38A is provided which can be located at any convenient place within the confines of the steel mill. It may comprise a base 39A having vertically disposed standards 40A, 41A on each side thereof.

Referring to FIGS. 4 and 5, the bottom of the bucket 13, in the embodiment disclosed, is open and has a plurality of segmentally shaped clam-shell components 38 that are connected to the lower peripheral edge of the bucket 13 by hinges 39. The hinges 39 may include ears 40 supported by pins 41 in lugs 42 that are integrally connected to the bottom of channel ring 16. The ears 40 may include abutments 43 adapted to strike the edge of channel ring 16, limiting the opening of the components 38. Each of the components 38 may include lugs 44 for a purpose to be described later.

Referring to FIG. 1, the standard 40A supports a bracket 45 on which a cylinder 46 is mounted, the piston rod 47 of the piston therein being connected to a nozzle 48 for reciprocable movement. Nozzle 48 is in the form of an elbow.

The outer end of nozzle 48 is beveled at 49 and adapted to mate with a beveled surface 50 on the trunnion 20. A suitable gasket can be used.

Blower means 51 driven by a motor (not shown) may be provided with a valve 52 to control the air flow to the trunnion 20. The construction is such that supplying fluid to the blank end of cylinder 46 forces nozzle 48 into sealing contact with surface 50 of trunnion 20 so that when valve 52 is opened, combustion air is supplied to the interior of trunnion 20.

Referring to FIG. 6, the charging frame 38A may have standards 52 rigidly fixed thereto for supporting sleeve-like telescoping members 53. A dish-like member 54 may be fixed to the tops of sleeves 53, and springs 55 (FIG. 3) may be located within the sleeves 53 for resiliently supporting the dish 54. Dish 54 has substantially the contour of the clam-shell bottom (in closed position) and includes a central hole 55' for a purpose to be described.

Figure 10:
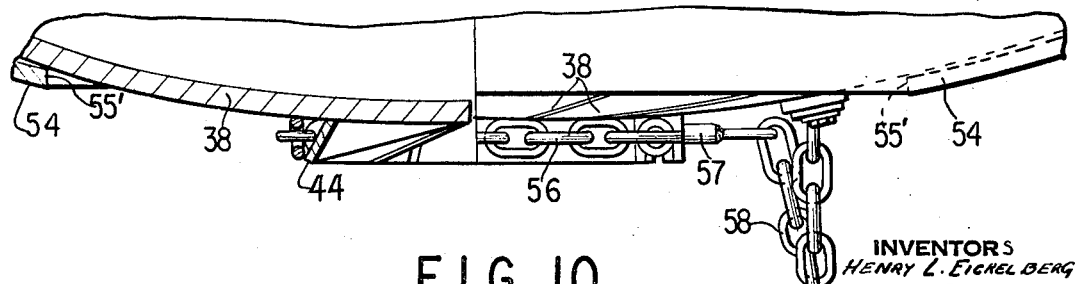
FIG. 10 is a section taken substantially along line 10—10 of FIG. 9.

In operation, the empty bucket 13, with its components 38 down, is carried by a crane to the location of the frame 38A and lowered so that the components 38 engage dish 54, causing them to pivot to their closed position. When this is completed, the lugs 44 will extend through hole 55' in dish 54 (FIG. 10). A chain 56 is placed about the lugs 44 and is locked by a draw pin 57 that is anchored to one of the components 38 by a chain 58. When the bucket 13 is in this position, trunnions 20, 21 are supported by the half bearings 42A, and the bucket is charged with scrap to be preheated. Flexible hose 59 (FIG. 1) is connected to the channel ring 34 supplying fuel to the nozzles 31. Blower 51 is then energized and cylinder 46 activated to connect nozzle 48 to the trunnion 20. A gas shut-off valve 60 is then opened manually and the lighting torch is applied to lighting holes beneath the burners. On initial light-up, a gas adjusting valve 61 is regulated to the proper air-gas ratio.

The combustion air entering the hollow trunnion 20 passes into the channel ring 15, thence passes through holes 28 downwardly through the annular passage between the wall of the inner container 14 and the outer shell 27, thence through holes 29 into the channel ring 16, thence through the space between each of the nozzles 31 and 32, mixing with the gas passing through the interior of nozzle 33.

The downstream of combustion air through the annular chamber surrounding container 14 will pick up radiation heat and heat losses from the inner container 14, and will transfer a part of this energy back into the combustion system by preheating the incoming combustion air. This will increase the overall efficiency of the system.

When the charge has been heated to the proper degree, the bucket 13 is picked up by a crane hook engaging hole 26 in the cross arm 25, lifting the bucket 13 from dish 54 and moving it to a point above the furnace to be charged. The top of the furnace is opened, the bucket lowered and the pin 57 withdrawn, whereupon the preheated charge is dropped onto the floor of the furnace. The open bucket is removed, the furnace closed and the heat proceeds. The bucket 13 is returned to dish 54 as previously described for a fresh charge to be preheated.

Although the various features of the improved gas-fired preheating system for charging buckets have been shown and described in detail to fully disclose one embodiment of the invention, it will be evident that changes may be made in such details, and certain features may be used without others without departing from the principles of the invention.

What is claimed is:

1. A charging bucket for steel mills and the like comprising in combination, a container having an openable bottom to drop a charge of material from the inside of said container; a channel-shaped manifold surrounding said container near its bottom; spaced holes about the wall of said container, providing communication between the interior of said container and the interior of said manifold; mixing burner nozzles in said holes; a frame for supporting said bucket; and means mounted on said frame for supplying combustion air and gas to said manifold.

2. A charging bucket for steel mills and the like comprising in combination, an inner container having an openable bottom for dropping a charge of material from within said container; a channel ring about the upper end of said container; another channel ring about the bottom of said container; verticallly arranged channel members extending between said channel rings; an outer shell surrounding said inner container and said channel members, forming an annular chamber between said inner container and said outer shell; hollow trunnions connected to said vertical channel members, there being communicating passage means between said trunnions, said vertical channel members, said upper channel ring, said annular chamber and said lower channel ring; spaced holes about the inner container communicating with said lower channel ring; burner nozzles in said holes; means for supplying combustion air to at least one of said hollow trunnions; and means for supplying gas to said nozzles.

3. A charging bucket for steel mills and the like comprising in combination, a container having an openable bottom to drop a charge of material from the inside of said container; a channel-shaped manifold surrounding said container near its bottom; spaced holes about the wall of said container, providing communication between the interior of said container and the interior of said manifold; mixing burner nozzles in said holes; means for supplying combustion air and gas to said manifold; and deflector means within said container on opposite sides of said holes.

4. A charging bucket for steel mills and the like comprising in combination, a container having an openable bottom to drop a charge of material from the inside of said container; a channel-shaped manifold surrounding said container near its bottom; spaced holes about the wall of said container, providing communication between the interior of said container and the interior of said manifold; mixing burner nozzles in said holes; a frame for supporting said bucket; means mounted on said frame for supplying combustion air and gas to said manifold; and deflector means within said container on opposite sides of said holes.

5. A charging bucket for steel mills and the like comprising in combination, an inner container having an openable bottom for dropping a charge of material from within said container; a channel ring about the upper end of said container; another channel ring about the bottom of said container; vertically arranged channel means extending between said channel rings; an outer shell surrounding said inner container and said channel members, forming an annular chamber between said inner container and said outer shell; hollow trunnion means connected to said vertical channel means, there being communicating passage means between said trunnion means, said vertical channel means, said upper channel ring, said annular chamber and said lower channel ring; spaced holes about the inner container communicating with said lower channel ring; burner nozzles in said holes; means for supplying combustion air to said hollow trunnion means; means for supplying gas to said nozzles; and deflector means within said container adjacent said holes.

6. A charging bucket for steel mills and the like comprising in combination, an inner container having an openable bottom for dropping a charge of material from within said container; a channel ring about the upper end of said container; another channel ring about the bottom of said container; vertically arranged channel means extending between said channel rings; an outer shell surrounding said inner container and said channel means, forming an annular chamber between said inner container and said outer shell; hollow trunnion means connected to said vertical channel means, there being communicating passage means between said trunnion means, said vertical channel means, said upper channel ring, said annular chamber and said lower channel ring; spaced holes about the inner container communicating with said lower channel ring; burner nozzles in said holes; means for supplying gas to said nozzles; a frame for supporting said bucket by said trunnion means; and means on said frame for supplying combustion air to said hollow trunnion means.

7. A charging bucket for steel mills and the like comprising in combination, an inner container having an openable bottom for dropping a charge of material from within said container; a channel ring about the upper end of said container; another channel ring about the bottom of said container; vertically arranged channel means extending between said channel rings; an outer shell surrounding said inner container and said channel means, forming an annular chamber between said inner container and said outer shell; hollow trunnion means connected to said vertical channel means, there being communicating passage means between said trunnion means, said vertical channel means, said upper channel ring, said annular chamber and said lower channel ring; spaced holes about the inner container communicating with said lower channel ring; burner nozzles in said holes; means for supplying gas to said nozzles; a frame including spaced uprights having trunnion supporting means at the top thereof for receiving said trunnion means; means for supporting a nozzle in line with the hollow trunnion means when said trunnion means are in said trunnion supporting means; and means for supplying combustion air to said aligned nozzle and for moving it into sealing relation with the ends of said hollow trunnions.

8. A charging bucket for steel mills and the like comprising in combination, an inner container having an openable bottom for dropping a charge of material from within said container; a channel ring about the upper end of said container; another channel ring about the bottom of said container; vertically arranged channel means extending between said channel rings; an outer shell surrounding said inner container and said channel means, forming an annular chamber between said inner container and said outer shell; hollow trunnion means connected to said vertical channel means, there being communicating passage means between said trunnion means, said vertical channel members, said upper channel ring, said annular chamber and said lower channel ring; spaced holes about the inner container communicating with said lower channel ring; burner nozzles in said holes; means for supplying gas to said nozzles; a frame including spaced upright means having trunnion supporting means at the top thereof for receiving said trunnion means; means at the top of said upright means for supporting a nozzle in line with the hollow trunnion means when they are in said trunnion supporting means; and means for forcing said nozzle into sealing relation with the end of said hollow trunnion means for ensuring a sealing relation between said nozzle and the end of said hollow trunnion means.

9. A charging bucket for steel mills and the like comprising in combination, a container having an openable bottom means to drop a charge of material from the inside of said container; an annular manifold surrounding said container near its bottom; spaced apertures about the wall of said container providing communication between the interior of said container and the interior of said manifold; mixing burner nozzles arranged relative to said apertures; a frame for supporting said bucket; and means for supplying combustion air and gas to said manifold while said bucket is supported by said frame.

References Cited

UNITED STATES PATENTS 2,220,797  11/1940  Bates et al. _____ 263—47
3,180,724  4/1965  Brooke _____ 294—69 X FREDERICK L. MATTESON, Jr., *Primary Examiner.*

E. G. FAVORS, *Assistant Examiner.*